(12) United States Patent
Naniwa et al.

(10) Patent No.: US 7,969,826 B2
(45) Date of Patent: Jun. 28, 2011

(54) THERMALLY ASSISTED MAGNETIC RECORDING HEAD HAVING MOVABLE MIRROR FOR OPTICAL SWITCHING

(75) Inventors: Irizo Naniwa, Fujisawa (JP); Yukio Kato, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 833 days.

(21) Appl. No.: 11/940,410

(22) Filed: Nov. 15, 2007

(65) Prior Publication Data

US 2008/0130155 A1 Jun. 5, 2008

(30) Foreign Application Priority Data

Nov. 16, 2006 (JP) .................................. 2006-310541

(51) Int. Cl.
*G11B 11/00* (2006.01)
(52) U.S. Cl. ...................... 369/13.13; 369/13.33; 360/59
(58) Field of Classification Search .................... 360/59; 369/13.33, 13.13, 13.32, 13.12, 13.17, 112.09, 369/112.14, 112.21, 112.27, 14, 15; 385/129, 385/31, 88–94; 250/201.3
See application file for complete search history.

(56) References Cited

U.S. PATENT DOCUMENTS

| 6,373,811 | B1 | 4/2002 | Ikegame et al. | |
|---|---|---|---|---|
| 6,700,855 | B2 | 3/2004 | Horie | |
| 6,873,576 | B1 * | 3/2005 | Van Kesteren | 369/13.17 |
| 7,412,143 | B2 * | 8/2008 | Rottmayer et al. | 385/129 |
| 7,580,602 | B2 * | 8/2009 | Itagi et al. | 385/37 |
| 2005/0217988 | A1 | 10/2005 | Yoshikawa et al. | |
| 2006/0005216 | A1 * | 1/2006 | Rausch | 720/659 |
| 2009/0244778 | A1 * | 10/2009 | Hasegawa et al. | 360/234 |
| 2009/0262608 | A1 * | 10/2009 | Kurita et al. | 369/13.33 |
| 2009/0296256 | A1 * | 12/2009 | Tsuyama | 360/59 |

FOREIGN PATENT DOCUMENTS

| JP | 02-165431 | 6/1990 |
|---|---|---|
| JP | 03-187295 | 8/1991 |
| JP | 06-148536 | 5/1994 |
| JP | 11-219537 | 8/1999 |

(Continued)

OTHER PUBLICATIONS

Ed. Gage, "Integration Challenge for Heat Assisted Magnetic Recording", IDMA Japan International Forum 2006, Jun. 9, 2006.

*Primary Examiner* — Tan X Dinh
(74) *Attorney, Agent, or Firm* — Antonelli, Terry, Stout & Kraus, LLP.

(57) ABSTRACT

In a thermally assisted magnetic recording head support mechanism, an increase in the temperature of a heat source for supplying an optical near-field transducer with light, due to heat generation by the heat source, is checked while holding back an increase in weight of a slider and lessening transmission loss of light.
The thermally assisted magnetic recording head support mechanism is made up such that a suspension 5 has one end holding a slider 4 on which a magnetic head 3 having a read element 31, write element 32, and an optical near-field transducer 34 is mounted, and the other end of the suspension 5 is held by a carriage 6. The optical block 15 provided with one light source 10, and an optical switching mechanism capable of switching a guidance destination of irradiated light from light source 10 is attached to an arm 62 or a support 61 of the carriage 6 having a wide heat release area, thereby guiding light from the optical block 15 to the optical near-field transducer 34 via an optical waveguide 14.

17 Claims, 9 Drawing Sheets

FOREIGN PATENT DOCUMENTS

| | | |
|---|---|---|
| JP | 2001-283403 | 10/2001 |
| JP | 2002-117502 | 4/2002 |
| JP | 2003-005103 | 1/2003 |
| JP | 2005-284264 | 10/2005 |
| JP | 2006-119316 | 5/2006 |
| JP | 2008-102978 | 5/2008 |

* cited by examiner (a)

(b)

(a)

(b)

THERMALLY ASSISTED MAGNETIC RECORDING HEAD HAVING MOVABLE MIRROR FOR OPTICAL SWITCHING

TECHNICAL FIELD

The invention relates to a thermally assisted magnetic recording head support mechanism that can be mounted in a thermally assisted magnetic recording disk drive.

BACKGROUND ART

Thermally assisted recording is a scheme whereby data is recorded on a magnetic disk by applying heat at not lower than 200° C., together with a magnetic field, to a recording bit region of the order of several tens of nm in diameter, on the magnetic disk. Hopes run high that the thermally assisted recording is a recording scheme capable of high-density magnetic recording. As means for causing an instantaneous increase in temperature of a minute recording bit region on a magnetic disk, use of an optical near-field is under study at present. For generation of the optical near-field, it is necessary to introduce light into an optical near-field transducer disposed in the vicinity of a recording pole of a magnetic head. Use of a laser diode (hereinafter referred to as an LD) as a light source for such a purpose is under study, however, an LD being a heat source as well as the light source, the LD has a problem in that oscillation output thereof undergoes deterioration, due to heat evolution of the LD itself. An LD for use in an optical disk recorder normally stops oscillation at 70° C. or higher.

In Patent Document 1, there has been disclosed a thermally assisted magnetic recording head wherein means for prevention of warming are disposed in the vicinity of a light source (heat source) disposed in close proximity of a write element to thereby avoid output deterioration due to heat evolution caused by the light source (heat source) itself. More specifically, four different means for prevention of warming are proposed as follows; (1) to provide a heat sink member in contact with a light source, (2) to carry out forced air-cooling with the use of a piezoelectric bimorph fan, (3) to devise a slider in such an unique shape as to guide a portion of an air flow passing by the slider to a light source to thereby effect air-cooling, and (4) to bring a slider into contact with a disk to thereby cause heat release toward the disk.

Further, in Non-patent Document 1, it has been described that an optical system comprising a light source, an incident light detector, a reflected light detector, a beam splitter, a lens, and a half-wave plate is disposed outside a slider, and a grating formed at the head part of a slider is irradiated with light from the optical system to thereby guide the light to a magnetic write element accompanying the slider, whereupon an optical near-field is generated by an optical near-field transducer to thereby heat a minute region on a disk, opposite to the slider, with an extremely minute interval provided therebetween.

[Patent Document 1] JP-A No. 2001-283403
[Non-patent Document 1] "Integration Challenge for Heat Assisted Magnetic Recording" by Ed. Gage, IDMA JAPAN International Forum 2006, Jun. 9, 2006

DISCLOSURE OF THE INVENTION

Problem to be Solved by the Invention

As above in the foregoing, a light source itself, necessary for the thermally assisted recording, is the heat source, and as such, has a problem in that an oscillation output undergoes deterioration due to an increase in temperature, caused by heat generated by the light source itself, resulting in stoppage of light emission in the worst case. In Patent Document 1, there have been disclosed the means for solving the problem, however, the means under items (1) to (3) as above, disclosed in Patent Document 1, will lead to an increase in weight of the slider and complexity in processing, and with the means under item (4) as above, deformation of the disk, and wear as well as heat generation, due to contact, should be taken into consideration.

Further, with the thermally assisted magnetic recording head disclosed in Patent Document 1, since an optical system including the light source is placed on the slider, there occurs an increase in weight of the tip of a suspension, resulting in an increase in burden on a voice coil motor (hereinafter referred to as VCM) for use in positioning of a magnetic head to thereby interfere with fast positioning, and leading to an increase in disturbance upon positioning of a head.

With a thermally assisted magnetic recorder disclosed in Non-patent Document 1, since the optical system is disposed outside the slider, there will results no adverse effect upon positioning of a head, and it is easy to curb an increase in the temperature of the light source, however, with a magnetic disk drive that is put in practical use, as the slider is constantly in motion while data is being written, it is difficult to accurately irradiate the grating with light to thereby hold back loss in light transmission. If the optical near-field transducer is low in efficiency, it is necessary to introduce light of high intensity, but an LD capable of emitting light of such high intensity will generate more heat accordingly. Therefore, loss of light to be propagated must be curbed as much as possible.

It is an object of the invention to provide a thermally assisted magnetic recording head support mechanism capable of holding back an increase in temperature of a heat source for supplying an optical near-field transducer with light, due to heat generation by the heat source, and holding back an increase in weight of a slider while lessening transmission loss of light.

Means for Solving the Problem

To that end, the invention provides a thermally assisted magnetic recording head support mechanism comprising a magnetic head having a read element, a write element, and an optical near-field transducer, formed on a slider supported by each of suspensions, the suspensions being supported by a carriage, wherein an optical block provided with one unit of light source, and an optical switching mechanism for switching a guidance destination of irradiated light from the light source is attached to an arm or a support of the carriage having a wide heat release area, and light from the optical block is guided to the optical near-field transducer via an optical waveguide.

The optical switching mechanism of the optical block preferably comprises one movable mirror for reflecting the irradiated light of the light source, a plurality of stationary mirrors for reflecting reflected light from the movable mirror, respectively, and a plurality of collimating lenses for condensing the reflected light from the stationary mirrors, respectively, and the guidance destination of the irradiated light of the light source is switched to any of the plurality of the collimating lenses by causing the movable mirror to swing, thereby delivering the irradiated light of the light source from the collimating lens to a first optical waveguide.

The movable mirror preferably comprises a mirror, a torsion bar supporting the mirror, an electromagnet for causing the mirror to swing by the agency of an electromagnetic attractive force thereof, and stoppers for deciding a swing angle of the mirror.

The optical switching mechanism of the optical block may comprise a second optical waveguide for receiving the irradiated light of the light source, a first fixed block for securing an end of the second optical waveguide, on a side thereof, adjacent to the light source, a movable block for securing the other end of the second optical waveguide, an actuator for transferring the movable block, a second fixed block for securing one end of each of a plurality of the first optical waveguides, and the guidance destination of the irradiated light of the light source is switched to any of the plurality of the first optical waveguides by transferring the movable block with the use of the actuator.

Gaps between the second optical waveguide, and the respective first optical waveguides are preferably filled up with an index-matching liquid, respectively Effect of the Invention The invention can provide a thermally assisted magnetic recording head support mechanism capable of holding back an increase in temperature of a heat source, due to heat generation by the heat source, and holding back an increase in weight of a slider while lessening transmission loss of light.

BEST MODE FOR CARRYING OUT THE INVENTION

Figure 2:
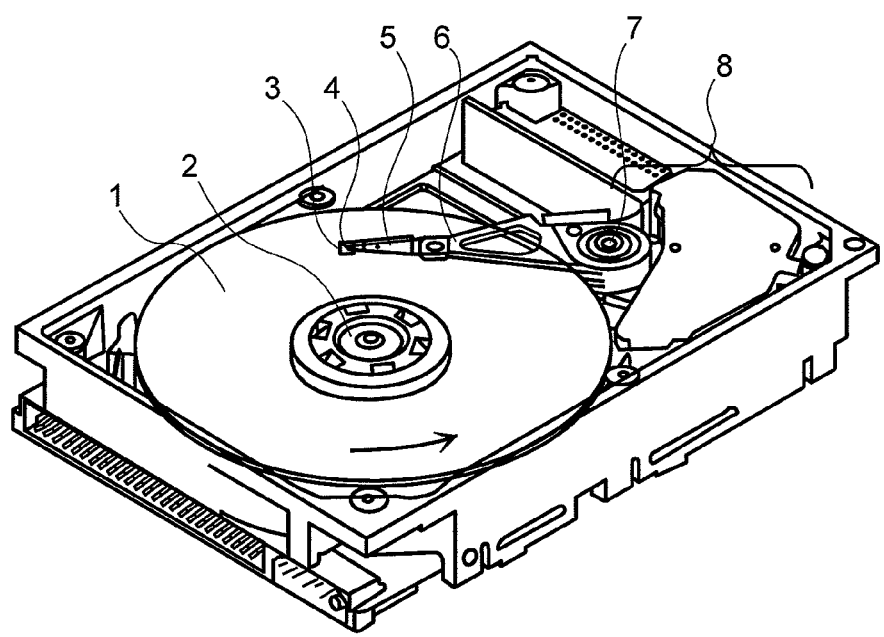
FIG. 2 is a view broadly showing a makeup of a magnetic disk drive associated with the invention.

FIG. 2 is a view broadly showing a makeup of a magnetic disk drive in which one embodiment of a thermally assisted magnetic recording head support mechanism according to the invention is mounted. A magnetic disk 1 is attached to a spindle motor 2, and is rotated by the spindle motor 2. A magnetic head 3 equipped with an optical near-field transducer is mounted on a slider 4, the slider 4 is held by a suspension 5, and the suspension 5 is supported by a carriage 6. The carriage 6 is swingably supported by a pivot 7 serving as a rotation axis. The slider 4 is given a load by the suspension 5 so as to oppose a recording face of the magnetic disk 1 in rotation with a predetermined interval provided therebetween. The carriage 6 is caused to swing by driving a voice coil motor (VCM) 8, and the slider 4 is caused to transfer to a desired track of the magnetic disk 1 in rotation, thereby executing write/read of information by use of the magnetic head 3 equipped with the optical near-field transducer. In the makeup described as above, a structure comprising the carriage 6, the suspension supported by the carriage 6, and the slider 4 held by the suspension 5 is called the thermally assisted magnetic recording head support mechanism.

A recording layer of the magnetic disk 1 has a coercive force not less than 2000 kA/m at room temperature, and at room temperature, no recording is made by the agency of a recording magnetic field produced by the magnetic head 3. By applying heat at not lower than 200° C., and a magnetic field to a recording bit region of the order of several tens of nm in diameter, on the recording layer of the magnetic disk 1, data can be recorded in the recording layer.

Embodiment 1

Figure 1:
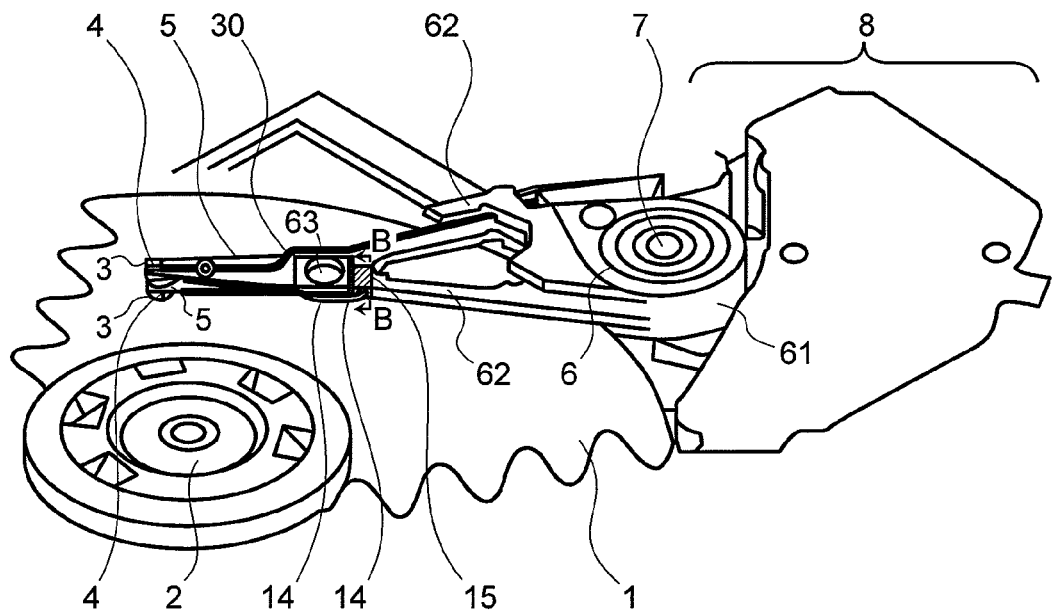
FIG. 1 is a view showing an overall makeup of a thermally assisted magnetic recording head support mechanism according to Embodiment 1 of the invention.
Figure 3:
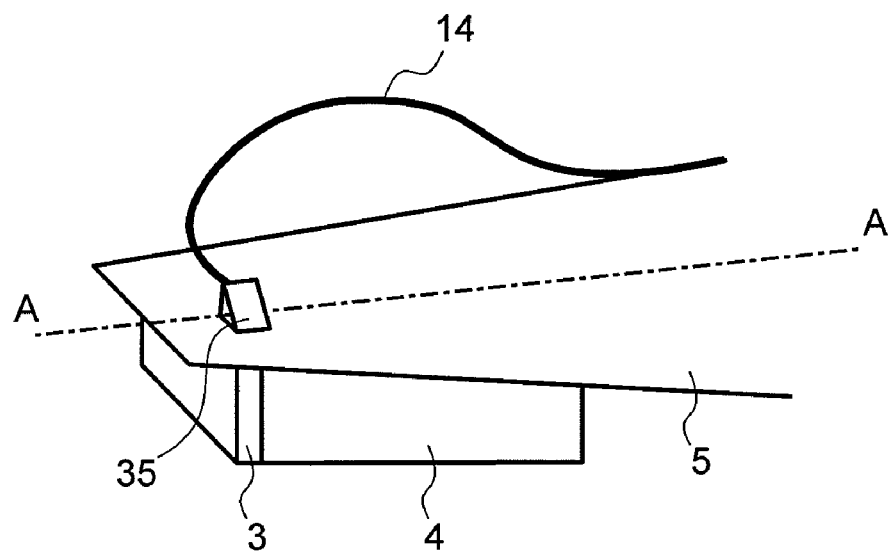
FIG. 3 is a view showing a peripheral part of a slider of the thermally assisted magnetic recording head support mechanism shown in FIG. 1.
Figure 4:
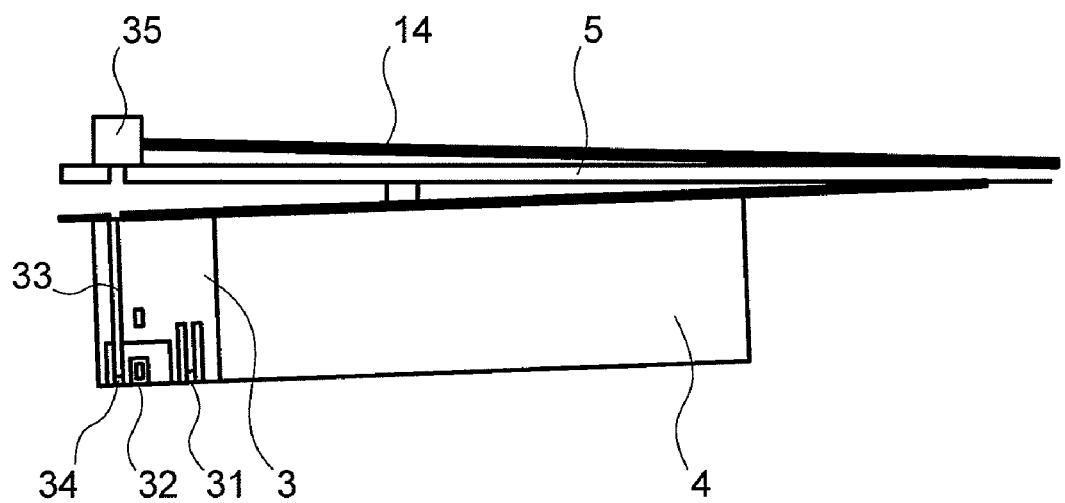
FIG. 4 is a sectional view of the peripheral part, taken on line A-A of FIG. 3.

FIG. 1 shows an overall makeup of a thermally assisted magnetic recording head support mechanism according to Embodiment 1, FIG. 3 shows a peripheral part of the slider held by the suspension, and FIG. 4 shows the peripheral part, in section, taken on line A-A of FIG. 3.

In FIG. 1, the carriage 6 comprises a support 61 swingably supported by the pivot 7, and a plurality of arms 62 extending from the support 61. In FIG. 1, there is seen a second arm 62 from the topmost one, among the plurality of the arms 62. Two lengths of suspensions 5 are attached to the top and bottom surfaces of the tip of the arm 62, respectively, with a caulking fixture part 63. Interconnections 30 having one end connected to respective lead wires of a write element, and a read element of a magnetic head 3 are stacked up on the suspension 5, and the other end of each of the interconnections 30 is connected to a terminal area connected to a preamp (not shown). An optical bench 15 equipped with a light source, as described later in the present specification, is mounted in the vicinity of the caulking fixture part 63 of the arm 62. Grooves are formed in the arm 62 at the time of fabricating the carriage 6, and by fitting the optical bench 15 into the grooves, the optical bench 15 can be mounted in the arm 62. Irradiated light from the light source of the optical bench 15 is guided to the respective sliders 4 through the optical waveguides 14 disposed along the suspensions 5, respectively, up to the respective sliders 4.

In FIGS. 3 and 4, a magnetic head 3 mounted on the slider 4, comprises a read element 31 equipped with a magnetoresistive element sandwiched between two sheets of magnetic shields, a magnetic induction type write element 32 equipped with a recording pole and a recording coil, an optical waveguide 33 adjacent to the recording pole of the magnetic induction type write element 32, and the optical near-field transducer 34. The irradiated light guided to the optical waveguide 14 reaches a mirror 35 provided at the tip of the suspension 5 to be reflected by the mirror 35, thereby passing through the optical waveguide 33 before reaching the optical near-field generation element 34. The optical near-field transducer 34 has a gap with a width not more than the wavelength of light, and converts the light into an optical near-field by means of the gap, whereupon a portion of the recording layer of the magnetic disk, opposite to the optical near-field transducer 34, is irradiated with the optical near-field, thereby heating the recording bit region of the order of several tens of nm in diameter up to 200° C. or higher.

Figure 5:
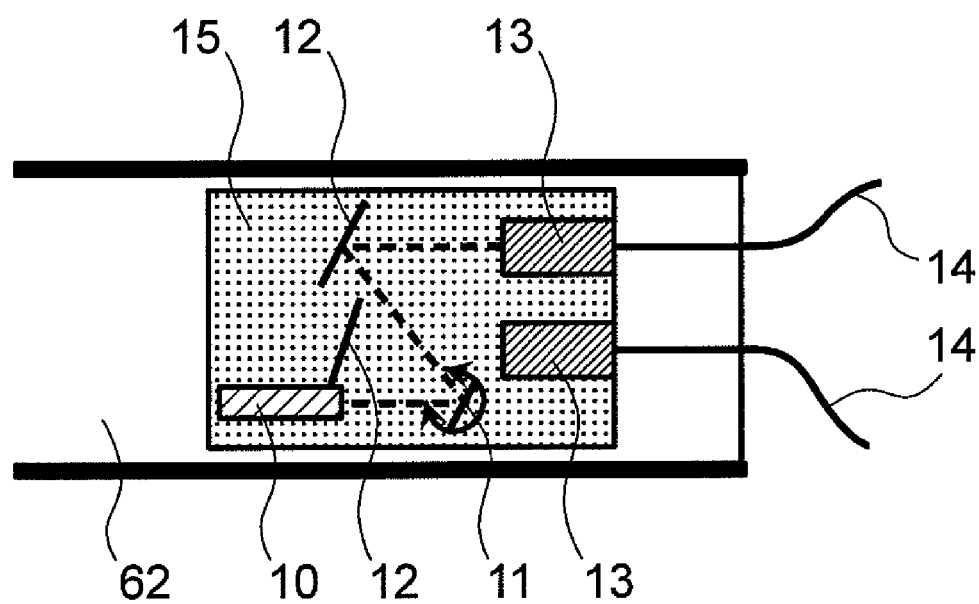
FIGS. 5A, 5B each are a view showing an internal makeup of an optical bench according to Embodiment 1 of the invention, being a sectional view taken on line B-B of FIG. 1.
Figure 5:
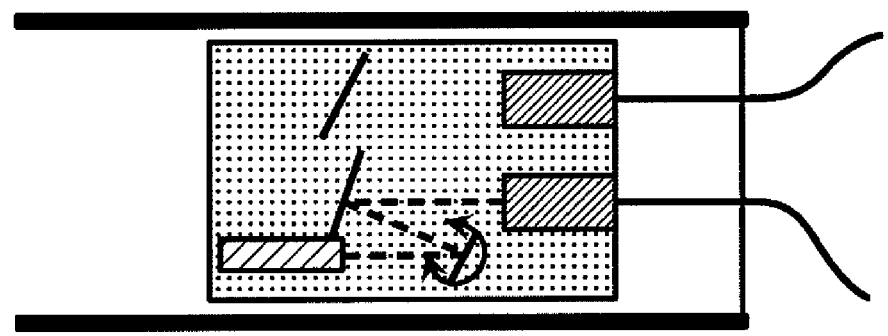

Next, a makeup of the optical bench 15 is described hereinafter with reference to FIGS. 5A, 5B, and FIG. 6. FIGS. 5A, 5B each are a cross-sectional view taken on line B-B of FIG. 1. The optical bench 15 is an optical block in which there are mounted a laser diode (LD) 10 as a light source, and an optical switching mechanism comprising a swingable type movable mirror 11, stationary mirrors 12, collimating lenses 13 for producing parallel light rays, and end portions of the respective optical waveguides 14 for receiving light from the respective collimating lenses 13. Light irradiated from the LD 10 is reflected by the swingable type movable mirror 11, and one of the stationary mirrors 12 in that order to be subsequently guided into the optical waveguide 14 disposed on the suspension 5 via one of the collimating lenses 13. By rotating the swingable type movable mirror 11, it is possible to switch a guidance destination of the light irradiated from the LD 10. FIG. 5A indicates a state in which light is guided to the slider 4 on an upper side while FIG. 5B indicates a state in which light is guided to the slider 4 on a lower side.

The swingable type movable mirror 11 is a mirror supported by a torsion bar, undergoing a swinging motion by the agency of an electromagnetic attractive force of an electromagnet, thereby switching back and forth between two reflection directions. A swing angle in respective reflection directions is decided by a stopper. As a result, it becomes possible to prevent occurrence of drift, so that the swing angle of the mirror can be correctly decided without the use of feedback control. Further, in combination with use of a permanent magnet, it becomes possible to effect self-holding whereby no energy is required except for switchover time, thereby enabling power consumption to be held back. As means for effecting the self-holding, use can be made of a mechanical latching mechanism besides the permanent magnet.

Figure 6:
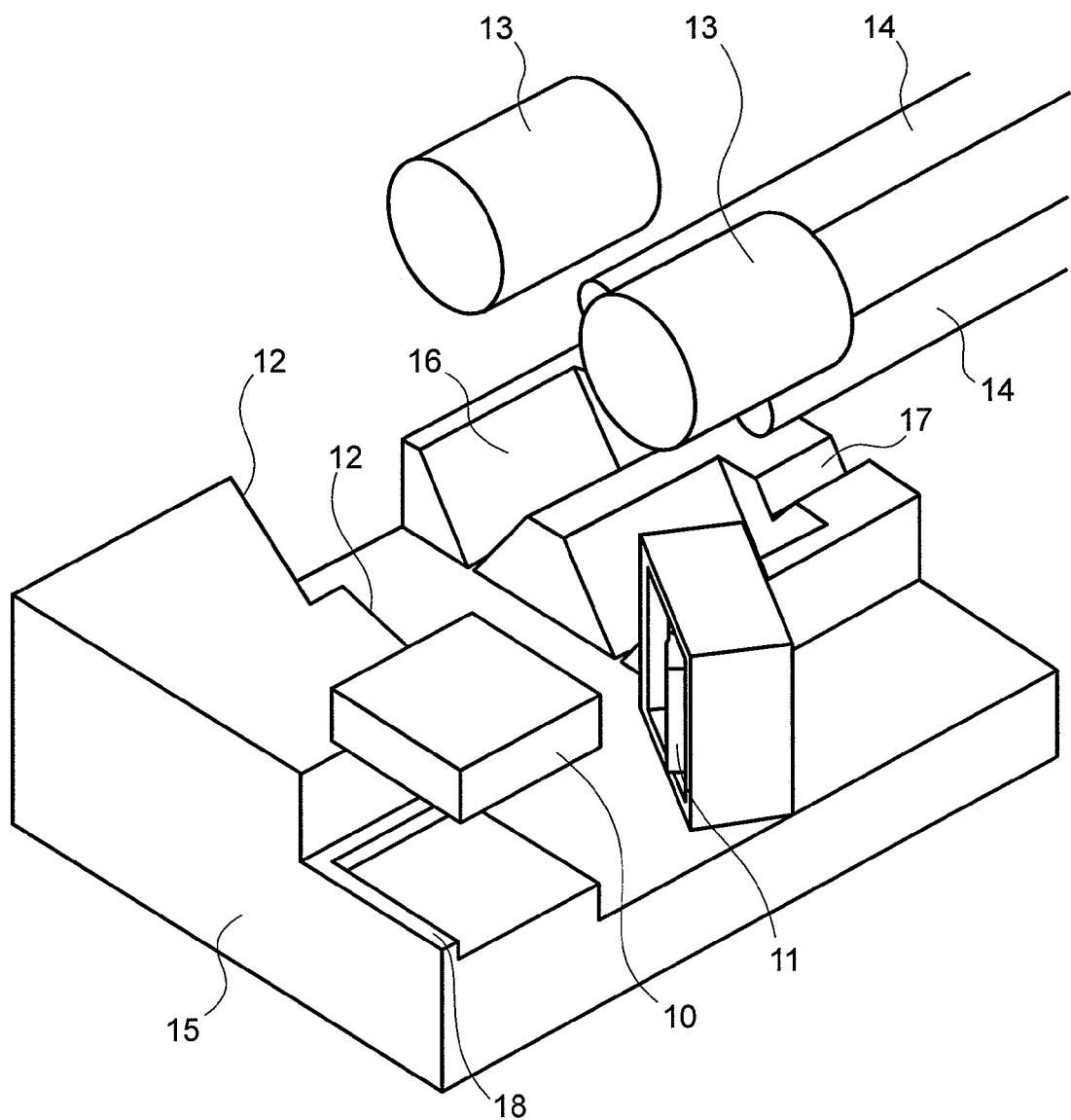
FIG. 6 is a perspective view of the optical bench according to Embodiment 1 of the invention.

In FIG. 6, there is shown a state in which the LD 10, the collimating lenses 13, and the optical waveguides 14 are mounted on the optical bench 15 with which the swingable type movable mirror 11, and the stationary mirrors 12 are integrally formed by the MEMS (Micro Electro Mechanical Systems) micromachining technology. The optical bench 15 is provided with a protrusion part 18 formed for positioning of the LD 10, grooves 16 formed for positioning of the respective collimating lenses 13, and grooves 17 formed for positioning of the respective optical waveguides 14, so that the LD 10, the respective collimating lenses 13, and the respective optical waveguides 14 can be mounted on predetermined positions, respectively, by use of the protrusion part, and those respective grooves. Use of the optical bench 15 enables an assembling wok to be simplified while adjustment of an optical system, such as optical alignment, can be facilitated.

With Embodiment 1, since the optical bench 15 for accommodating the light source (the LD) 10, which is a heat generator, is mounted on the arm 62 of the carriage 6, as described above, it is possible to reduce the number of the LDs 10. Further, because a heat release area of the carriage 6 is wide, it is possible to hold back an increase in the temperature of the LD itself, due to heat generation by the LD 10, thereby solving the problem of deterioration in the oscillation output, or stoppage of oscillation. Further, since there is no need for mounting the LD 10 on the slider 4, it is possible to prevent an increase in the weight of the slider 4. Accordingly, a burden on the VCM 8 for executing positioning of the slider 4 is rendered lighter, and an adverse effect due to vibration of the slider 4 can be decreased so that fast positioning is enabled. In addition, since light from the optical bench 15 is guided to the respective sliders 4 via the respective optical waveguides 14, transmission loss of the light can be reduced.

Further, with Embodiment 1, the stationary mirrors 12 and the collimating lenses 13 are disposed in the direction of thickness of the arm 62 (in the vertical direction along the plane of the figure), however, those components can be disposed in the transverse direction thereof (in the direction normal to the plane f the figure) instead.

Further, if the optical bench 15 is covered with a metal high in thermal conductivity, such as copper, this will enable heat generated from the LD 10 to be actively released to the carriage 6 having a wide heat release area.

Still further, if a fin structure is formed in the carriage 6, this will enable cooling efficiency to be further enhanced.

Yet further, with Embodiment 1, for driving the swingable type movable mirror 11, a magnetic attraction type actuator is used, however, use can be made of a VCM actuator utilizing the Lorentz force, an electrostatic actuator, a piezoelectric actuator, and so forth instead.

Figure 7:
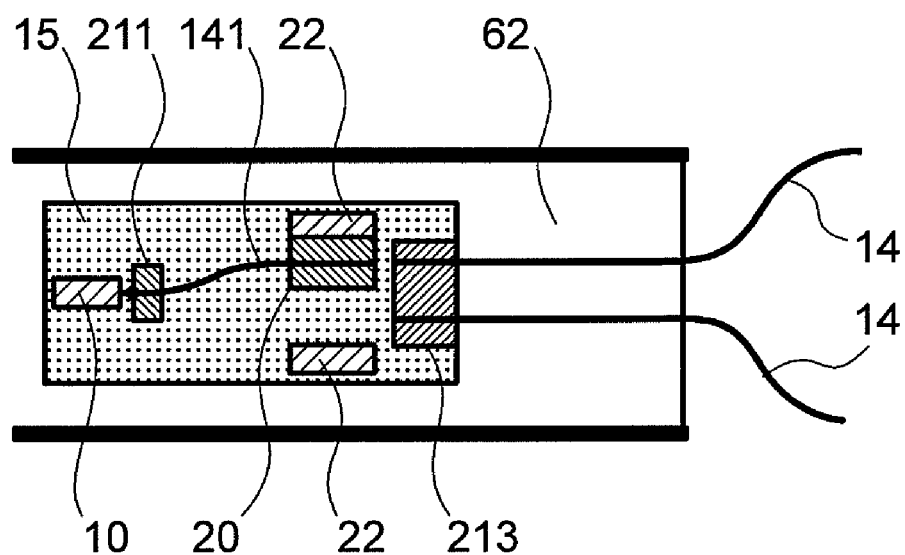
FIGS. 7A, 7B each are a view showing an internal makeup of an optical bench according to variation of Embodiment 1.
Figure 7:
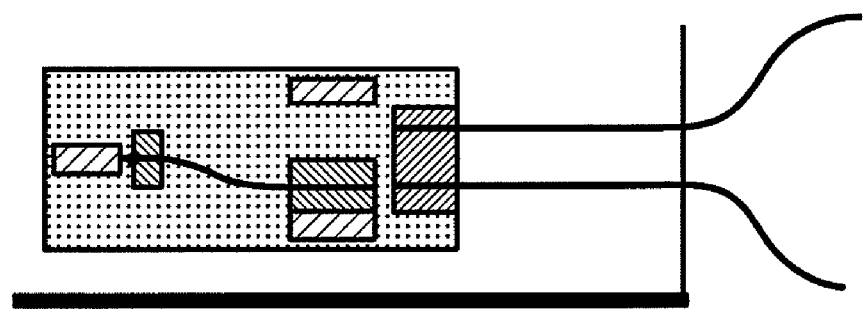

Next, there is described a variation of Embodiment 1 with reference to FIGS. 7A, 7B. An overall makeup of a thermally assisted magnetic recording head support mechanism according to the variation is the same as that for Embodiment 1, shown in FIG. 1. The variation differs from Embodiment 1 only in respect of the optical switching mechanism. Constituents of the variation, identical to those of Embodiment 1, are denoted by like reference numerals, and the constituents of the variation, differing from those of Embodiment 1, are described hereinafter. An optical bench 15 comprises an LD 10 serving as a light source for supplying an optical near-field transducer with optical energy, an optical waveguide 141 for receiving light irradiated from the LD 10, a fixed block 211 for securing an end of the optical waveguide 141, on a side thereof, adjacent to the LD 10, a movable block 20 for securing the other end of the optical waveguide 141, an actuator for moving the movable block 20, and stoppers 22, and a fixed block 213 for securing optical waveguides 14 leading to respective suspensions 5. Further, gaps between the optical waveguide 141, and the respective optical waveguides 14 are preferably filled up with an index-matching liquid for adjustment of refractive index in order to reduce transmission loss of light at respective coupling spots.

As is the case with Embodiment 1, this optical bench 15 as well can be formed by the MEMS micromachining technology. As base members, there are formed the fixed block 211, the movable block 20, the actuator for moving the movable block 20, and the stopper 22, and the fixed block 213, and further, there are provided a protrusion part 18 for positioning of the LD 10, a groove in the fixed block 211, for positioning of the optical waveguide 141, and grooves in the fixed block 213, for positioning of the respective optical waveguides 14. By use of the protrusion part, and the respective grooves, positioning is implemented for the LD 10, the optical waveguide 141, and the respective optical waveguides 14 to be then mounted on respective positions. For the optical waveguide 141, and the respective optical waveguides 14, use can be made of a polymer optical waveguide, however, those optical waveguides can be formed integrally with each other inside the optical bench 15.

Light irradiated from the LD 10 is guided to either the slider 4 on an upper side, or the slider 4 on a lower side by moving the movable block 20 with the use of the actuator of a linear type. FIG. 7A indicates a state in which the light is guided to the slider 4 on the upper side while FIG. 7B indicates a state in which the light is guided to the slider 4 on the lower side. Respective positions of the movable block 20 are decided by either of the stoppers 22. As a result, it becomes possible to eliminate the adverse effect due to drift and disturbance, thereby reducing the transmission loss of the light. Further, in combination with use of a permanent magnet, it becomes possible to effect self-holding whereby no energy is required except for the switchover time, thereby enabling power consumption to be held back. As means for effecting the self-holding, use can be made of the mechanical latching mechanism besides the permanent magnet.

Thus, with the variation described as above, since the optical bench 15 is mounted in the arm 62 of the carriage 6, and the guidance destination of the irradiated light from the LD 10 is changed over by the movable block 20, it becomes possible to reduce the number of the LDs 10 to be mounted, as is the case with Embodiment 1, so that an increase in temperature, due to heat generated by the LD 10, can be prevented, and vibration of the slider 4, due to an increase in weight thereof, can be decreased. Further, by filling up the gap between the optical waveguide 141, and the respective optical waveguides 14 with the index-matching liquid for the adjustment of refractive index, it becomes possible to further reduce transmission loss of light, due to air, as compared with the case of Embodiment 1.

Further, the variation is made up such that the movable block 20 is moved in the direction of the thickness of the arm 62 (in the vertical direction along the plane f the figure), however, the variation can be made up such that the same can be moved in the transverse direction thereof (in the direction normal to the plane f the figure) instead.

Embodiment 2

Figure 8:
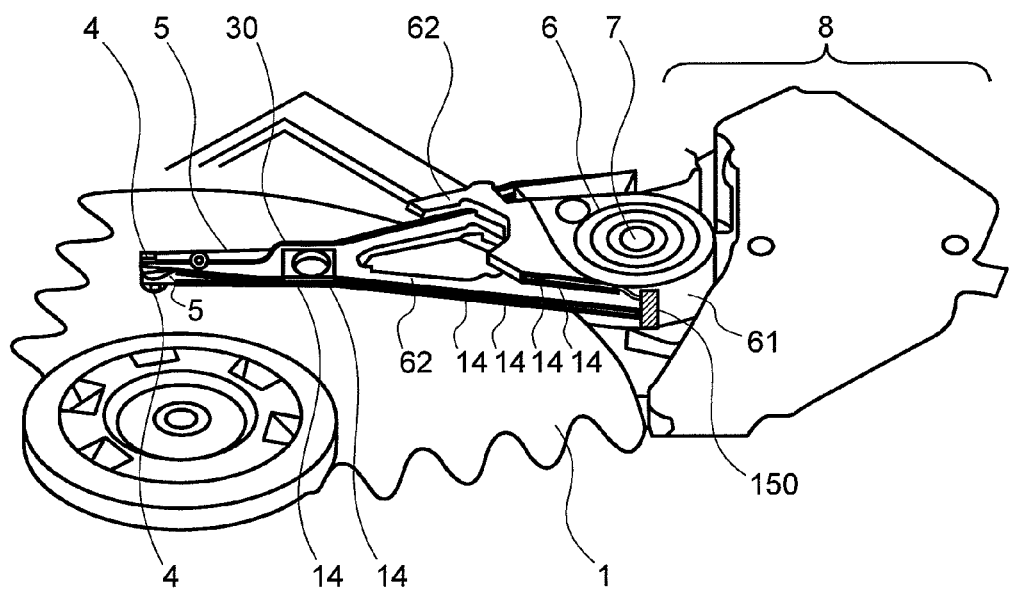
FIG. 8 is a view showing an overall makeup of a thermally assisted magnetic recording head support mechanism according to Embodiment 2 of the invention.

FIG. 8 shows an overall makeup of a thermally assisted magnetic recording head support mechanism according to Embodiment 2. The overall makeup of a thermally assisted magnetic recording head support mechanism according to Embodiment 2 is the same as that for Embodiment 1, shown in FIG. 1. Embodiment 2 differs from Embodiment 1 only in respect of a mounting position of an optical bench 150, and an optical switching mechanism. Constituents of Embodiment 2, identical to those of Embodiment 1, are denoted by like reference numerals, and the constituents of the Embodiment 2, differing from those of Embodiment 1, are described hereinafter. In FIG. 8, the optical bench 150 is mounted in a support 61 of a carriage 6. Grooves are formed in the support 61 at the time of fabricating the carriage 6, and by fitting the optical bench 150 into the grooves, the optical bench 150 can be mounted in the support 61. Further, it is also possible to attach the optical bench 150 to the surface of the support 61. Irradiated light from a light source of the optical bench 150 is guided to four lengths of optical waveguides 14. Two lengths of the optical waveguides 14, on a lower side of the optical bench 150, reach two lengths of suspensions 5 attached to the top and bottom surfaces of the tip of a lower arm 62, along a side face thereof, respectively, and the two lengths of the optical waveguides 14 are disposed so as to reach as far as sliders 4, along the respective suspensions 5, respectively, while light guided into the respective optical waveguides 14 is guided up to the respective sliders 4. Further, two lengths of the optical waveguides 14, on an upper side of the optical bench 150, are disposed along a side face of an upper arm 62 so as to reach as far as respective sliders 4 (not shown) supported by the upper arm 62.

Figure 9:
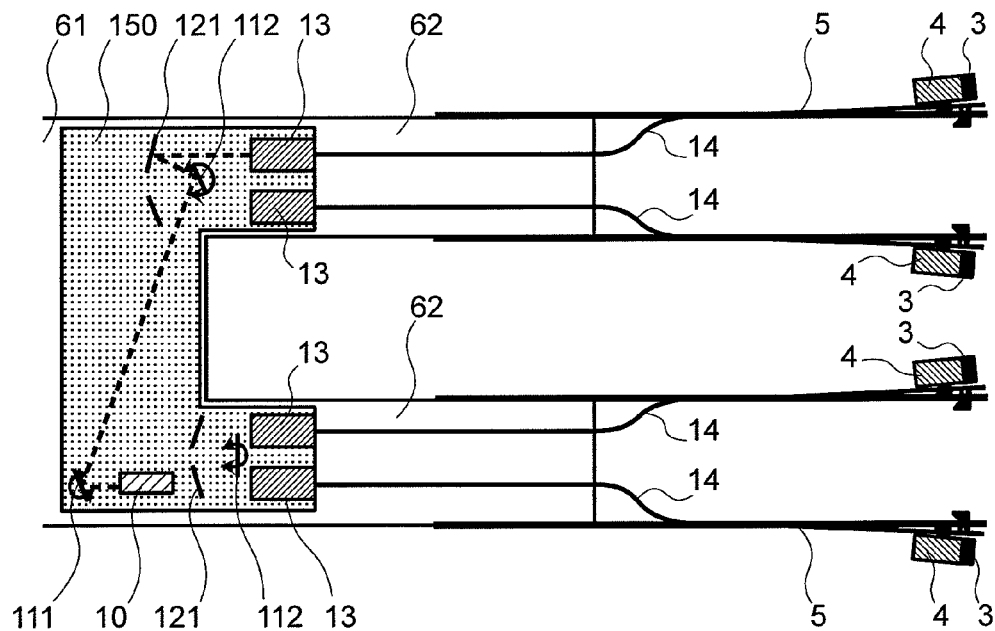
FIG. 9 is a view showing an internal makeup of an optical bench according to Embodiment 2 of the invention.

FIG. 9 is a side view of the thermally assisted magnetic recording head support mechanism shown in FIG. 8. The optical bench 150 is shown in through-view in order to illustrate an internal structure thereof. The respective suspensions 5 on the top and bottom sides are supported by the upper and lower arms 62 of the carriage 6, respectively, and the optical waveguides 14 are disposed on four lengths in total of the suspensions 5, respectively. The optical bench 150 mounted in the support 61 is an optical block in which there are mounted base members comprising an LD 10 as a light source for supplying an optical near-field transducer with optical energy, one piece of first swingable type movable mirror 111, two pieces of second swingable type movable mirrors 112, four pieces of stationary mirrors 121, collimating lenses 13 for producing parallel light rays, respectively, and end portions of the respective optical waveguides 14. With Embodiment 2 as well, a protrusion part and grooves, for use in positioning of the first swingable type movable mirror 111, the second swingable type movable mirrors 112, the stationary mirrors 121, the LD 10, the collimating lenses 13, and the respective optical waveguides 14 can be integrally formed by the MEMS micromachining technology, as is the case with Embodiment 1.

Light irradiated from the LD 10 is reflected by the first swingable type movable mirror 111, the second swingable type movable mirrors 112, the stationary mirrors 121 in that order to subsequently pass through one of the optical waveguides 14 via one of the collimating lenses 13, reaching the slider 4 equipped with an optical near-field transducer to be converted into an optical near-field. By causing the first swingable type movable mirror 111, and the second swingable type movable mirrors 112 to swing, the light irradiated from the LD 10 is guided to any of the four pieces of the slider 4, as desired. Further, in this case, use is made of a plurality of the swingable type movable mirrors, and as is the case with Embodiment 1, a guidance destination of the light is switched over by use of the swingable type movable mirrors for deciding a swing angle in each of two reflection directions with the use of the stopper. As a result, it is possible to prevent occurrence of drift, so that the swing angle of the mirror can be correctly decided without the use of feedback control.

As described above, with Embodiment 2, since the optical bench 150 is mounted on the support 61 of the carriage 6, and a guidance destination of the light irradiated from the LD 10 is switched over by the first swingable type movable mirror 111, and the second swingable type movable mirrors 112, it becomes possible to supply the four pieces of the sliders with light by use of one piece of the LD 10, so that an increase in temperature, due to heat generated by the LD 10, can be prevented, and vibration of the slider 4, due to an increase in weight thereof, can be decreased. Further, as the optical bench 150 is mounted in the vicinity of a pivot 7, it is possible to hold back an effect of moment of inertia, due to an additional mass, to thereby reduce power consumption at a VCM 8 while effectively checking disturbance.

Further, with Embodiment 2, the first swingable type movable mirror 111, the second swingable type movable mirrors 112, the stationary mirrors 121, and the collimating lenses 13 are disposed in the axial direction (in the vertical direction along the plane of the figure) of the support 61 of the carriage 6, however, those components can be disposed in the direction perpendicular to the axis of the support 61 (in the direction normal to the plane f the figure) instead.

Figure 10:
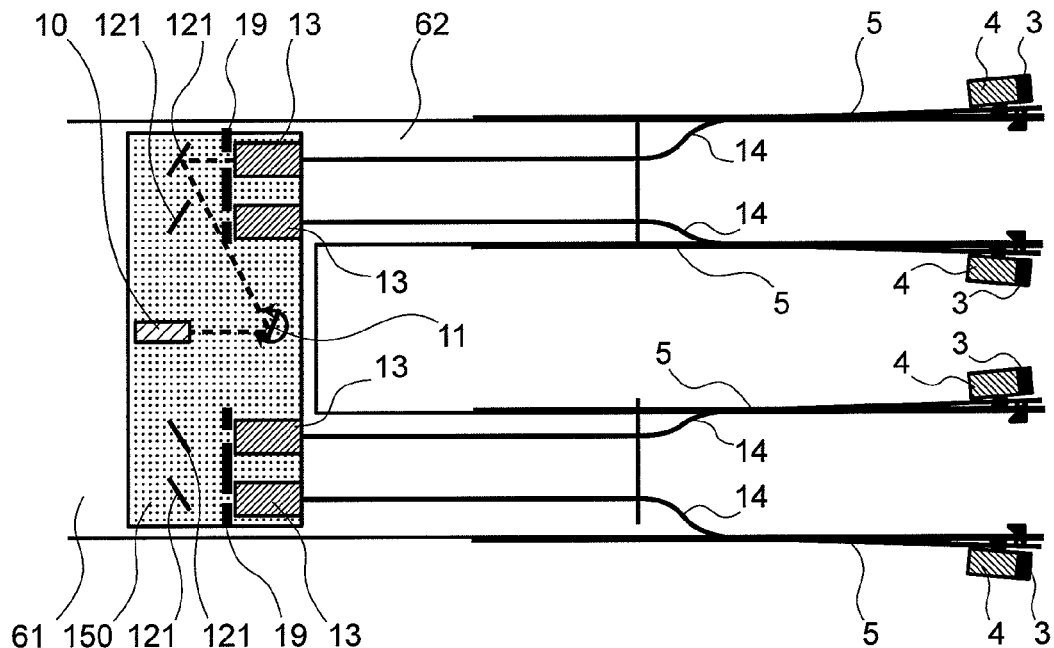
FIG. 10 is a view showing an internal makeup of an optical bench according to variation 1 of Embodiment 2.

Further, four pieces of the sliders are involved in this case, however, if the number of the swingable type movable mirrors is increased, the invention can be applied even to the case where the number of the sliders is more than four pieces Next, there is described variation 1 of Embodiment 2 with reference to FIG. 10. An overall makeup of a thermally assisted magnetic recording head support mechanism according to the variation 1 is the same as that for Embodiment 2, shown in FIG. 8. The variation 1 differs from Embodiment 2 only in respect of the optical switching mechanism of the optical bench 150. Constituents of the variation 1, identical to those of Embodiment 2, are denoted by like reference numerals, and the constituents of the variation 1, differing from those of Embodiment 2, are described hereinafter. An optical bench 150 is mounted in a support 61 of a carriage 6, and the optical bench 150 is an optical block in which there are mounted an LD 10 as a light source for supplying an optical near-field transducer with optical energy, one piece of swingable type movable mirror 11, four pieces of stationary mirrors 121, a photo-detector (PD) 19, and four pieces of collimating lenses 13. In the optical bench 150, a protrusion part and grooves, for use in positioning of the swingable type movable mirror 11, the stationary mirrors 121, the LD 10, the collimating lenses 13, and respective optical waveguides 14 can be integrally formed by the MEMS micromachining technology, Light irradiated from the LD 10 is reflected by the swingable type movable mirror 11, the stationary mirror 121 in that order to subsequently pass through one of the optical waveguides 14, disposed on a suspension 5, via one of the collimating lenses 13, reaching a slider 4 equipped with an optical near-field transducer to be thereby converted into an optical near-field. By causing the swingable type movable mirror 11 to swing in four steps, the light irradiated from the LD 10 is guided to one of four pieces of the sliders 4, as desired. As means for driving the swingable type movable mirror 11, use can be made of the VCM actuator capable of swinging the mirror supported by the torsion bar with the use of the Lorentz force. With the VCM actuator, since a generated torque is proportional to an input current, and a swing angle can be easily found on the basis of the generated torque, and torsional rigidity, it is possible to swing the mirror by only a desired angle by controlling the input current to thereby cause light to be reflected in a desired direction. Furthermore, by carrying out feedback control on the basis of a signal from the photo-detector (PD) 19 disposed before the collimating lenses, it becomes possible to eliminate assembling errors, and effects of drift and disturbance, thereby holding back transmission loss of light.

Thus, by mounting the optical bench 150 on the support 61 of the carriage 6, and switching a guidance destination of the light irradiated from the LD 10 by causing the swingable type movable mirror 11 to swing in the four steps, it becomes possible to supply the four pieces of the sliders with light by use of one piece of the LD 10, and the one piece of the swingable type movable mirror 11. Accordingly, as is the case with Embodiment 2, an increase in temperature, due to heat generated by the LD 10, can be prevented, and vibration of the sliders, due to an increase in weight thereof, can be lessened while the number of the swingable type movable mirrors, as movable parts, can be concurrently curbed to a minimum. Further, by mounting the optical bench 150 in the vicinity of the pivot 7, it is possible to hold back the effect of moment of inertia, due to the additional mass, to thereby reduce the power consumption at the VCM 8 while effectively checking the disturbance.

With the variation 1, the number of the sliders is four, however, by causing the swingable type movable mirror 11 to swing in more than four stages, the invention can be applied even to the case where the number of the sliders is more than four pieces.

Figure 11:
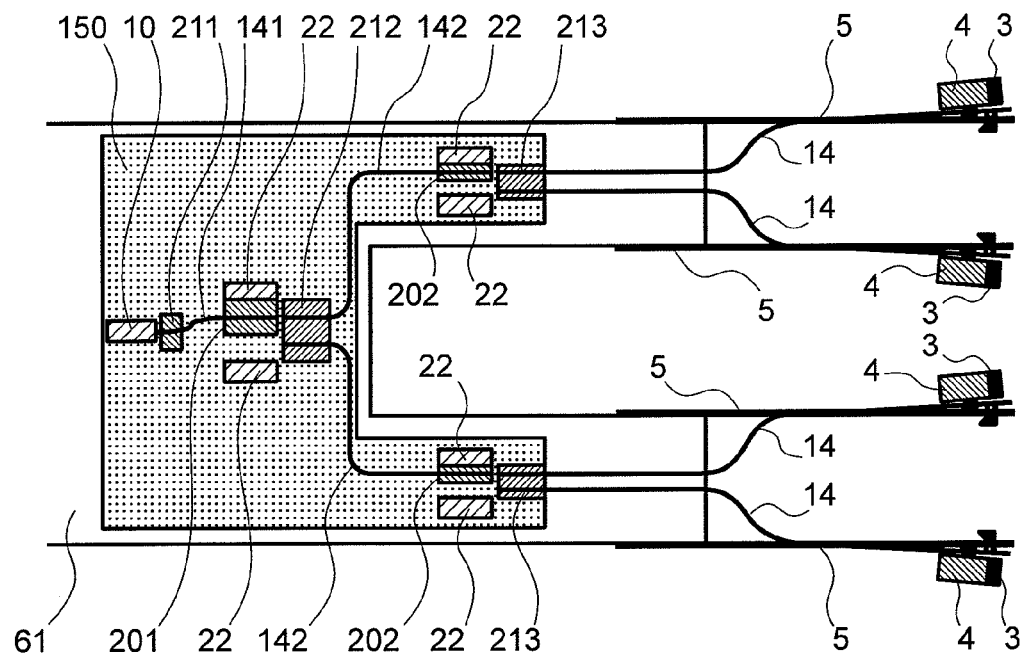
FIG. 11 is a view showing an internal makeup of an optical bench according to variation 2 of Embodiment 2.

Next, there is described variation 2 of Embodiment 2 with reference to FIG. 11. An overall makeup of a thermally assisted magnetic recording head support mechanism according to the variation 2 is the same as that for Embodiment 2, shown in FIG. 8. The variation 2 differs from Embodiment 2 only in respect of the optical switching mechanism of the optical bench 150. Constituents of the variation 2, identical to those of Embodiment 2, are denoted by like reference numerals, and the constituents of the variation 2, differing from those of Embodiment 2, are described hereinafter. An optical bench 150 is mounted in a support 61 of a carriage 6, and the optical bench 150 is an optical block in which there are mounted an LD 10 as a light source for supplying an optical near-field transducer with optical energy, an optical waveguide 141 for receiving light irradiated from the LD 10, a fixed block 211 for securing an end of the optical waveguide 141, on a side thereof, adjacent to the LD 10, one piece of first movable block 201 for securing the other end of the optical waveguide 141, two lengths of optical waveguides 142, a fixed block 212 for securing one end of each of the optical waveguides 142, two pieces of second movable blocks 202 for securing the other end of each of the optical waveguides 142, actuators for moving the second movable blocks 202, respectively, stoppers 22, and fixed blocks 213 for securing one end of each of optical waveguides 14 leading toward suspensions 5, respectively.

In the optical bench 150, the first movable block 201, the second movable blocks 202, the fixed block 211, the actuators for moving the second movable blocks 202, respectively, and the stoppers 22 can be integrally formed by the MEMS micromachining technology.

Light irradiated from the LD 10 passes through the optical waveguide 141, the respective optical waveguides 142, and the respective optical waveguides 14 leading toward suspensions 5 to thereby reach respective sliders 4 equipped with an optical near-field transducer before being converted into an optical near-field. By moving the first movable block 201 and the two pieces of the second movable blocks 202 with the use of the respective actuators of the linear type, the light irradiated from the LD 10 is guided to any of four pieces of the slider 4, as desired. A position of the first movable block 201 and respective positions of the second movable blocks 202 are decided by the respective stoppers 22. As a result, it becomes possible to eliminate the adverse effect due to drift and disturbance, thereby reducing the transmission loss of the light. Further, in combination with use of a permanent magnet, it becomes possible to effect self-holding whereby no energy is required except for the switchover time, thereby enabling power consumption to be held back. As means for effecting the self-holding, use can be made of the mechanical latching mechanism besides the permanent magnet.

Thus, by mounting the optical bench 150 on the support 61 of the carriage 6, it becomes possible to supply the four pieces of the sliders with light by use of one piece of the LD 10, and as is the case with Embodiment 2, it is possible to prevent an increase in temperature, due to heat generated by the LD 10, and to lessen vibration of the sliders, due to an increase in weight thereof. Further, by mounting the optical bench 150 in the vicinity of the pivot 7, it is possible to hold back the effect of moment of inertia, due to the additional mass, to thereby reduce the power consumption at the VCM 8 while effectively checking the disturbance. Furthermore, in this case, since the light irradiated from the LD 10 passes through all the optical waveguides except for a coupling spot provided between the respective optical waveguides adjacent to each other, it is possible to check attenuation in light intensity.

Figure 12:
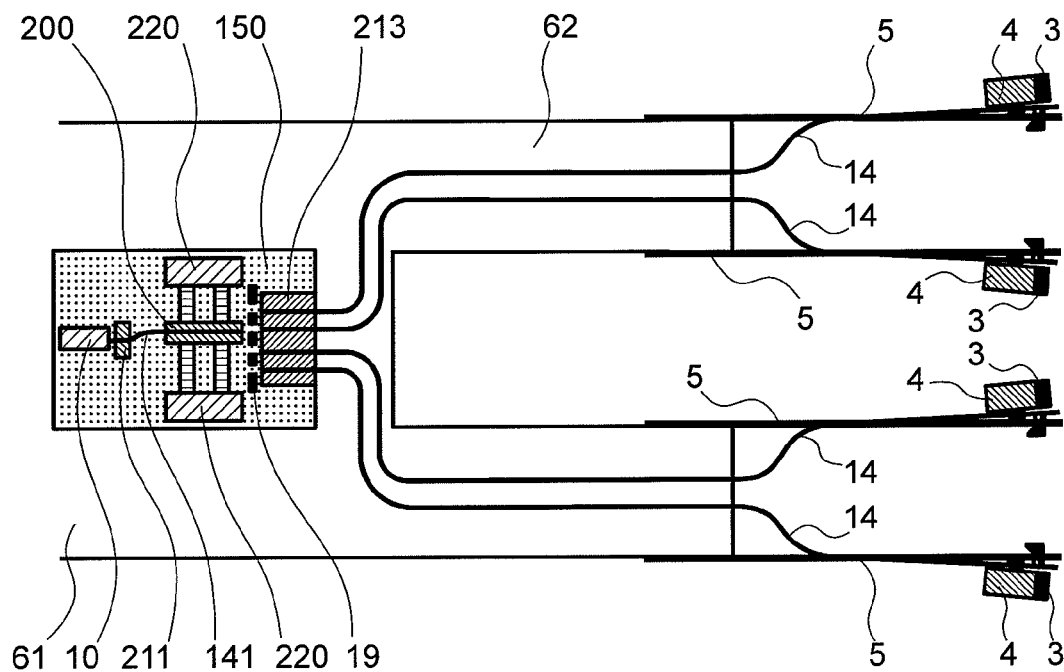
FIG. 12 is a view showing an internal makeup of an optical bench according to variation 3 of Embodiment 2.

Next, there is described variation 3 of Embodiment 2 with reference to FIG. 12. An overall makeup of a thermally assisted magnetic recording head support mechanism according to the variation 3 is the same as that for Embodiment 2, shown in FIG. 8. The variation 3 differs from Embodiment 2 only in respect of the optical switching mechanism of the optical bench 150. Constituents of the variation 3, identical to those of Embodiment 2, are denoted by like reference numerals, and the constituents of the variation 3, differing from those of Embodiment 2, are described hereinafter. An optical bench 150 is mounted in a support 61 of a carriage 6, and the optical bench 150 is an optical block in which there are mounted an LD 10 as a light source for supplying an optical near-field transducer with optical energy, an optical waveguide 141 for receiving light irradiated from the LD 10, a fixed block 211 for securing an end of the optical waveguide 141, on a side thereof, adjacent to the LD 10, a movable block 200 for securing the other end of the optical waveguide 141, an actuator for moving the movable blocks 200, stoppers 220, a photo-detector (PD) 19, and a fixed block 213 for securing optical waveguides 14 leading from inside the carriage 6 to suspensions 5, respectively.

In the optical bench 150, the movable block 200, the fixed blocks 211, 213 the actuator for moving the blocks 200, and the stoppers 22 can be integrally formed by the MEMS micromachining technology.

Light irradiated from the LD 10 passes through the optical waveguide 141 for receiving the light irradiated from the LD 10 therethrough, and the optical waveguides 14 leading from inside the carriage 6 to the suspensions 5, respectively, and the respective optical waveguides 14 leading toward suspensions 5 to thereby reach respective sliders 4 equipped with an optical near-field transducer before being converted into an optical near-field. By moving the movable block 200 in four stages with the use of the actuator of the linear type, the light irradiated from the LD 10 is guided to any of four pieces of the sliders 4, as desired. By carrying out feedback control on the basis of a signal from the photo-detector (PD) 19 disposed on a face of the fixed block 213 for securing the optical waveguides 14 leading from the carriage 6 toward the suspensions 5, respectively, opposite to the movable block 200, it becomes possible to eliminate assembling errors, and effects of drift and disturbance, thereby holding back transmission loss of light in the coupling spots.

Thus, as the optical bench 150 is mounted on the support 61 of the carriage 6, it becomes possible to supply the four pieces of the sliders with light by use of one piece of the LD 10, and as is the case with Embodiment 2, it is possible to prevent an increase in temperature, due to heat generated by the LD 10, and to lessen vibration of the sliders, due to an increase in weight thereof. Further, by mounting the optical bench 150 in the vicinity of the pivot 7, it is possible to hold back the effect of moment of inertia, due to the additional mass, to thereby reduce the power consumption at the VCM 8 while effectively checking the disturbance. Furthermore, in this case, since the light irradiated from the LD 10 passes through all the optical waveguides except for a coupling spot provided between the respective optical waveguides adjacent to each other, it is possible to cause the movable block 200 to move in multistages with ease besides checking attenuation in light intensity, so that the variation 3 has an additional advantage in that the number of the sliders can be increased with ease.

Figure 13:
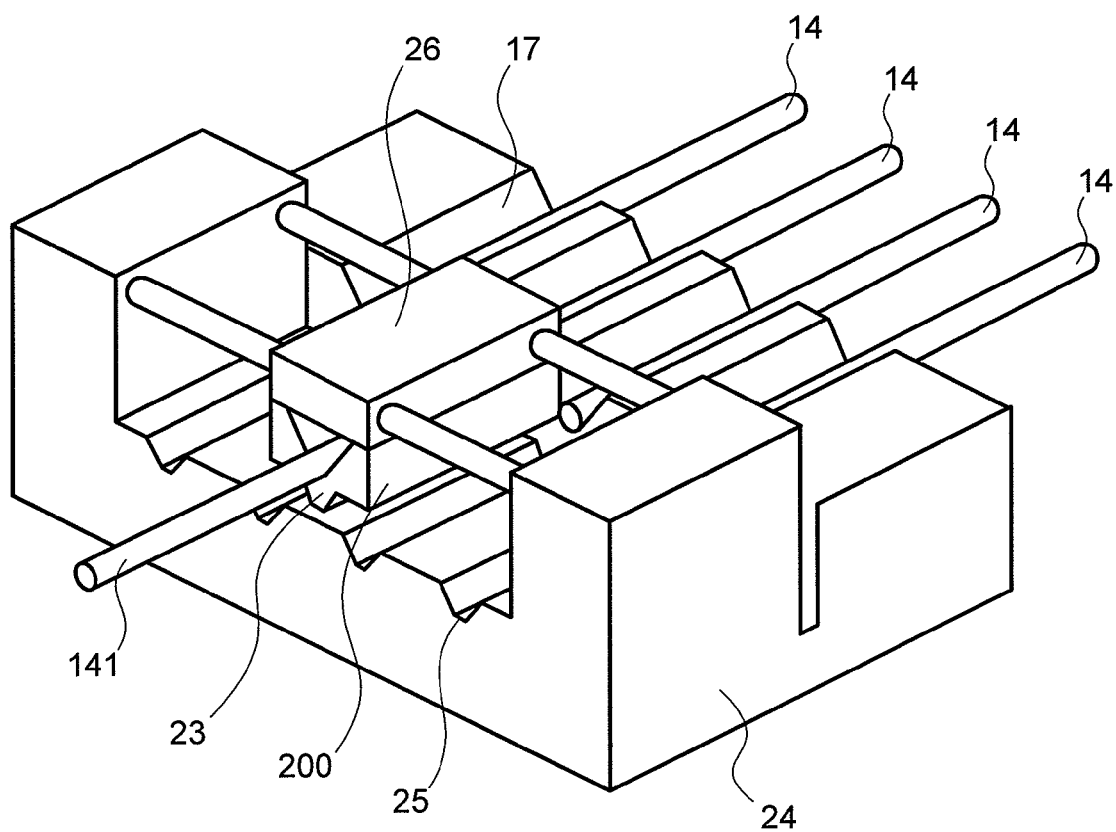
FIG. 13 is a perspective view of an actuator portion of the optical bench according to the variation 3 of Embodiment 2.

FIG. 13 is a perspective view of an actuator portion of the optical bench 150 shown in FIG. 12. The movable block 200 is attracted and transferred by an electromagnet 26, and the electromagnet 26 is de-energized at a desired position, whereupon movable block 200 is released. By engaging a protrusion part 23 for positioning, formed on the movable block 200, with any of grooves 25 provided on an actuator base 24, it is possible to correctly couple the optical waveguide 141 leading from the LD 10 up to any of the optical waveguides 14 secured to positioning grooves 17, respectively, as desired.

EXPLANATION OF REFERENCE NUMERALS

Magnetic disk 1, Spindle motor 2, Magnetic head 3, Slider 4, Suspension 5, Carriage 6, Pivot 7, Voice coil motor (VCM) 8, Laser diode (LD) 10, Swingable type movable mirror 11, Stationary mirrors 12, Collimating lenses 13, Optical waveguides 14, Optical bench 15 (Optical block), Grooves 16 formed for positioning of the respective collimating lenses, Grooves 17 formed for positioning of the respective optical waveguides, Protrusion part 18 formed for positioning of the LD, Movable block 20, Stoppers 22, Interconnections 30, Read element 31, Write element 32, Optical waveguide 33, Optical near-field transducer 34, Mirror 35, Support 61, Arms 62, First swingable type movable mirror 111, Second swingable type movable mirrors 112, Stationary mirrors 121, Optical bench 150 (Optical block), Optical waveguide 141, Optical waveguides 142, First movable block 201, Second movable blocks 202, Fixed block 211, Fixed block 212, Fixed block 213

The invention claimed is:

1. A thermally assisted magnetic recording head support mechanism comprising:
   a carriage having a support and an arm extending from the support;
   suspensions attached to the top and bottom surfaces of the arm, respectively;
   a slider supported by each of the suspensions, with a magnetic head mounted thereon, the magnetic head having a read element, a write element, and an optical near-field transducer;
   an optical block attached to the carriage, provided with one unit of light source, and an optical switching mechanism for switching a guidance destination of irradiated light from the light source; and
   a plurality of first optical waveguides for receiving light from the optical block to be subsequently guided to the optical near-field transducer,
   wherein the optical switching mechanism comprises a second optical waveguide for receiving the irradiated light of the light source, a first fixed block for securing an end of the second optical waveguide, on a side thereof, adjacent to the light source, a movable block for securing the other end of the second optical waveguide, an actuator for transferring the movable block, a second fixed block for securing one end of each of the plurality of the first optical waveguides, and the guidance destination of the irradiated light of the light source is switched to any of the plurality of the first optical waveguides by transferring the movable block with the use of the actuator.

2. A thermally assisted magnetic recording head support mechanism according to claim 1, wherein the optical switching mechanism comprises one movable mirror for reflecting the irradiated light of the light source, a plurality of stationary mirrors for reflecting reflected light from the movable mirror, respectively, and a plurality of collimating lenses for condensing the reflected light from the stationary mirrors, respectively, and a guidance destination of the irradiated light of the light source is switched to any of the plurality of the collimating lenses by causing the movable mirror to swing, thereby delivering the irradiated light of the light source from the collimating lens to the first optical waveguide.

3. A thermally assisted magnetic recording head support mechanism according to claim 2, wherein the movable mirror comprises a mirror, a torsion bar supporting the mirror, an electromagnet for causing the mirror to swing by the agency of an electromagnetic attractive force thereof, and stoppers for deciding a swing angle of the mirror.

4. A thermally assisted magnetic recording head support mechanism according to claim 1, wherein gaps between the second optical waveguide, and the respective first optical waveguides are filled up with an index-matching liquid, respectively.

5. A thermally assisted magnetic recording head support mechanism according to claim 1, wherein the optical block is covered with a metal high in thermal conductivity.

6. A thermally assisted magnetic recording head support mechanism according to claim 1, wherein a plurality of fins is formed on the carriage.

7. A thermally assisted magnetic recording head support mechanism comprising:
  a carriage having a support and an arm extending from the support;
  two suspensions attached to the arm;
  two sliders supported by the suspensions, respectively, with a magnetic head mounted thereon, the magnetic head having a read element, a write element, and an optical near-field transducer;
  an optical block attached to the arm of the carriage, provided with one unit of light source, and an optical switching mechanism for switching a guidance destination of irradiated light from the light source; and
  two lengths of first optical waveguides for receiving light from the optical block to be subsequently guided to the respective optical near-field transducer of the sliders,
  wherein the optical switching mechanism comprises a second optical waveguide for receiving the irradiated light of the light source, a first fixed block for securing an end of the second optical waveguide, on a side thereof, adjacent to the light source, a movable block for securing the other end of the second optical waveguide, an actuator for transferring the movable block, a second fixed block for securing one end of each of the two lengths of the first optical waveguides, and the guidance destination of the irradiated light of the light source is switched to any of the two lengths of the first optical waveguides by transferring the movable block with the use of the actuator.

8. A thermally assisted magnetic recording head support mechanism according to claim 7, wherein the optical switching mechanism comprises one piece of movable mirror for reflecting the irradiated light of the light source, two pieces of stationary mirrors for reflecting reflected light from the movable mirror, respectively, and two pieces of collimating lenses for condensing the reflected light from the stationary mirrors, respectively, and a guidance destination of the irradiated light of the light source is switched to any of the two pieces of the collimating lenses by causing the movable mirror to swing, thereby delivering the irradiated light of the light source from the collimating lens to the first optical waveguide.

9. A thermally assisted magnetic recording head support mechanism according to claim 8, wherein the movable mirror comprises a mirror, a torsion bar supporting the mirror, an electromagnet for causing the mirror to swing by the agency of an electromagnetic attractive force thereof, and stoppers for deciding a swing angle of the mirror.

10. A thermally assisted magnetic recording head support mechanism according to claim 7, wherein gaps between the second optical waveguide, and the respective first optical waveguides are filled up with an index-matching liquid, respectively.

11. A thermally assisted magnetic recording head support mechanism comprising:
  a carriage having a support and a plurality of arms extending from the support;
  suspensions attached to the top and bottom surfaces of each of the arms, respectively;
  a slider supported by each of the suspensions, with a magnetic head mounted thereon, the magnetic head having a read element, a write element, and an optical near-field transducer;
  an optical block attached to the support of the carriage, provided with one unit of light source, and an optical switching mechanism for switching a guidance destination of irradiated light from the light source; and
  a plurality of first optical waveguides for receiving light from the optical block to be subsequently guided to the respective optical near-field transducer of the sliders,
  wherein the optical switching mechanism comprises:
  a second optical waveguide for receiving the irradiated light of the light source,
  a first fixed block for securing an end of the second optical waveguide, on a side thereof, adjacent to the light source,
  a first movable block for securing the other end of the second optical waveguide,
  a first actuator for transferring the movable block,
  a second fixed block for securing one end of each of the plurality of the first optical waveguides, and
  a guidance destination of the irradiated light of the light source is switched to any of the plurality of the first optical waveguides by transferring the first movable block with the use of the first actuator.

12. A thermally assisted magnetic recording head support mechanism according to claim 11, wherein the optical switching mechanism comprises a first movable mirror for reflecting the irradiated light of the light source, a plurality of second movable mirrors for reflecting reflected light from the first movable mirror, respectively, a plurality of stationary mirrors for reflecting reflected light from the second movable mirrors, respectively, and a plurality of collimating lenses for condensing the reflected light from the stationary mirrors, respectively, and a guidance destination of the irradiated light from the light source is switched to any of the plurality of the collimating lenses by causing the first movable mirror and the second movable mirrors to swing, thereby delivering the irradiated light of the light source from the collimating lens to the first optical waveguide.

13. A thermally assisted magnetic recording head support mechanism according to claim 12, wherein the first movable mirror, and each of the second movable mirrors comprise a mirror, a torsion bar supporting the mirror, an electromagnet for causing the mirror to swing by the agency of an electromagnetic attractive force thereof, and stoppers for deciding a swing angle of the mirror.

14. A thermally assisted magnetic recording head support mechanism according to claim 11, wherein the optical switching mechanism comprises one movable mirror for reflecting the irradiated light of the light source, a plurality of stationary mirrors for reflecting reflected light from the movable mirror, respectively, and a plurality of collimating lenses for condensing the reflected light from the stationary mirrors, respectively, and a guidance destination of the irradiated light of the light source is switched to any of the plurality of the collimating lenses by causing the movable mirror to swing, thereby delivering the irradiated light of the light source from the collimating lens to the first optical waveguide.

15. A thermally assisted magnetic recording head support mechanism according to claim 14, wherein a photo-detector is additionally disposed in a stage preceding the plurality of the collimating lenses, and a swing angle of the movable mirror is controlled on the basis of an output of the photo-detector.

16. A thermally assisted magnetic recording head support mechanism according to claim 11,
   wherein the optical switching mechanism comprises:
   a plurality of third optical waveguides for receiving light from the second optical waveguide, respectively,
   a second fixed block for securing one end of each of the third optical waveguides,
   a plurality of second movable blocks for securing the other end of each of the third optical waveguides,
   a second actuator for transferring the second movable blocks, respectively, and
   a plurality of third fixed blocks for securing respective ends of the plurality of the first optical waveguides, and
   a guidance destination of the irradiated light of the light source is switched to any of the plurality of the first optical waveguides by transferring the first movable block with the use of the first actuator, and by transferring the second movable blocks with the use of the second actuator.

17. A thermally assisted magnetic recording head support mechanism according to claim 11, wherein a photo-detector is additionally disposed in a stage preceding the plurality of the collimating lenses, and a swing angle of the movable mirror is controlled on the basis of an output of the photo-detector.

\* \* \* \* \*